United States Patent
Alvarez-Mendez et al.

(10) Patent No.: US 6,711,818 B2
(45) Date of Patent: Mar. 30, 2004

(54) METHOD FOR MACHINING OPENING IN WORKPIECES

(75) Inventors: Angel Alvarez-Mendez, Stolberg (DE); Volker Steude, Köln (DE)

(73) Assignee: Visteon Global Technologies, Inc., Dearborn, MI (US)

(*) Notice: Subject to any disclaimer, the term of this patent is extended or adjusted under 35 U.S.C. 154(b) by 64 days.

(21) Appl. No.: 10/031,623

(22) PCT Filed: May 15, 2001

(86) PCT No.: PCT/EP01/05523
§ 371 (c)(1),
(2), (4) Date: Jan. 16, 2002

(87) PCT Pub. No.: WO01/87522
PCT Pub. Date: Nov. 22, 2001

(65) Prior Publication Data
US 2002/0104411 A1 Aug. 8, 2002

(51) Int. Cl.[7] .................. B23B 1/00; B23B 27/00; B21D 53/12
(52) U.S. Cl. .................. 29/898.067; 82/1.3; 82/1.11
(58) Field of Search .................. 52/1.11; 409/131, 409/132; 29/898.065, 898.067

(56) References Cited

U.S. PATENT DOCUMENTS

| 5,238,340 A | * | 8/1993 | Ochiai et al. ............... 409/201 |
| 5,876,161 A | * | 3/1999 | Ikola et al. .................. 409/132 |
| 6,210,307 B1 | * | 4/2001 | Van Horssen ................. 483/1 |
| 6,550,140 B1 | * | 4/2003 | Kochsiek ............... 29/898.067 |

FOREIGN PATENT DOCUMENTS

| DE | 38 18 827 A1 | 12/1988 |
| EP | 0 952 364 A1 | 10/1999 |
| GB | 2 242 147 | 9/1991 |

* cited by examiner

Primary Examiner—A. L. Wellington
Assistant Examiner—Brian D. Walsh
(74) Attorney, Agent, or Firm—Brinks Hofer Gilson & Lione

(57) ABSTRACT

A procedure to machine openings in work pieces which provides two cutting blades (11, 12), defining a cutting blade axis, adjacent to a work piece in which an opening is to be machined, the opening defining a distance between two oppositely positioned opening edges and defining an opening axis. The opening axis and the cutting blade axis are inclined at an acute angle (α) to one another in a way that the distance between the cutting blades parallel to the opening axis (9) is equal to the required distance between the opening edges. With the increasing wear of the cutting blades, the inclination angle is reduced so that the cutting blade distance parallel to the opening axis continues to correspond to the required distance of the opening edges.

22 Claims, 1 Drawing Sheet

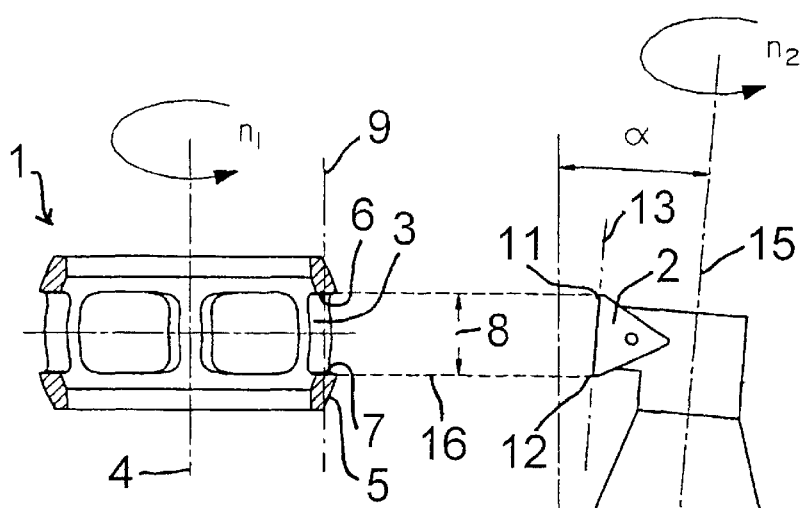
Fig. 1
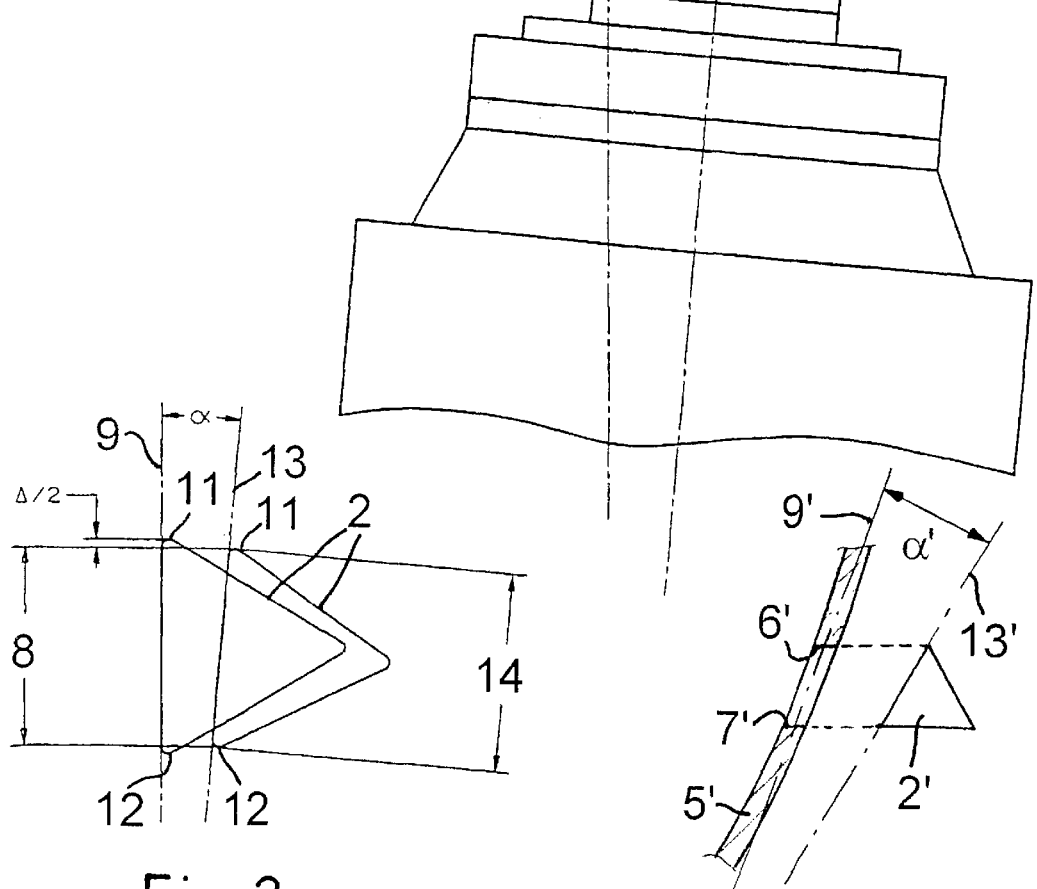
Fig. 2
Fig. 3

METHOD FOR MACHINING OPENING IN WORKPIECES

BACKGROUND OF THE INVENTION

1. Field of Invention

The invention refers to a procedure for machining openings in work pieces, in particular windows in ball cages for constant velocity joints.

2. Description of the Prior Art

In almost every passenger vehicle two constant velocity joints are required. In the production of these constant velocity joints, two windows with very exact tolerances have to be introduced intro ball cages. The dimension has to be controlled to ¹⁄₁₀₀₀ mm to ensure guiding of the balls free of play. Typically, the windows of the ball cages are first punched and then finished with a single-tooth milling cutter, which sits on a powered shaft. The cutting blade wear arising in this procedure is a factor that cannot be neglected.

EP 0 952 364 A1 describes such a procedure to finish the windows of ball cages. To maintain the exact dimension for the height and the width of a window in such a procedure, typically one edge of a window is machined first with one cutting blade and then the opposite edge of the window is machined with the opposite cutting blade. Here, the tool's wear is balanced by measuring the window dimension again and, if it shows that the tolerances are likely to be exceeded, the position of the respective cutting blade is moved to the respective limit of the tolerance area. This way it is possible to maintain the very narrow tolerances on the window dimensions in spite of tool wear. A disadvantage of such a procedure is that the machining time is relatively long. It is know from EP 0 952 364 A1 that two opposing window opening edges can be machined simultaneously with one tool, which leads to a reduction of the machining time. In this document, however, no hint is given as to how the narrow tolerance requirements can be met with the occurring wear of the tool over the lifetime of the tool.

In contrast to this, the purpose of this invention is to improve a procedure of the kind mentioned in the beginning that maintains a high dimensional accuracy and reduces the time to manufacture openings in work pieces.

According to the invention, such a task is successfully carried out in this kind of procedure by the following steps: Positioning of the two cutting blades alongside the cutting blade axis at a distance from each other, which is greater than the required distance of the opening edges; inclining the imagined opening axis and the cutting blade axis in an initial state at an acute angle to each other so that the effective distance between the cutting blades defined along a line parallel to the opening axis is equal to the required distance of the opening edges, and reduction of the inclination angle with increasing wear of the cutting blades so that the cutting blade distance parallel to the opening axis continues to correspond to the required distance between the opening edges.

In another aspect, the present invention is defined by the steps of: providing a cutting tool, which rotates around an axis of rotation, having two cutting blades positioned alongside the axis of rotation and defining a distance between them along an axis running through both blades; supporting a work piece near the cutting tool and defining an opening axis running through two oppositely positioned opening edges to be machined therein, providing the opening axis at a predetermined angular alignment relative to the cutting blade axis, and machining the opening edges in the work piece by cutting one opening edge with one cutting blade and the other opening edge with the other cutting blade, forming the opening edges at a required dimension from one another as defined along the opening axis.

According to the method of the invention, openings in work pieces can be machined in one machining operation, i.e., in only one step and thus the machining times can be cut in half without affecting the machining accuracy. Since the cutting blade axis is inclined to the central axis of the opening to be manufactured and this inclination is reduced with increasing wear of the cutting blades, the reduction of the wear-related cutting blade distance is compensated for and thus the required distance of the opening edges is maintained. According to the invention, wear of both cutting blades is therefore simultaneously compensated for. Thus, the ball cage window width is manufactured in one step; where the window width is maintained constant over the lifetime of the tool, that is to say, in spite of tool wear. In doing so, the cutting tool can be swung around a fixed point relative to the imagined window axis.

The invention is preferably used to finish or rework openings that have been manufactured in previous work steps, although the term machining of the opening edges may also comprise complete manufacturing of an opening in a work piece.

Preferably, within the framework of the invention, the opening axis and the cutting blade axis are in an initial position inclined relative to one another by an included angle of approximately 5°. For angles above a maximum of about 5°, the difference in machining depth due to the inclination at the two oppositely positioned opening edges is so small, especially with windows in ball cages for constant velocity joints, that in practice it can be neglected.

According to the invention, as the cutting blades wear the inclination angle from the initial position of about 5° is reduced to about 0°, with the cutting blades being totally worn at about 0°. With these measures, the cutting tool—avoiding too great an initial inclination, which is not desired in production technology—is used optimally. Additionally, the level of wear can also be read from the inclination.

According to the invention, the inclination angle of the cutting blade axis is adjusted into an initial position and thereafter the inclination angle is reduced. In doing so, especially the cutting blade axis and the axis of rotation should be rigidly joined. To position and reduce the inclination angle, the inclination of the axis of rotation is adjusted. Preferably, the cutting blade axis is placed parallel to the axis of rotation of the cutting tool. In the framework of the invention, however, the cutting blade axis may also be defined so as to be not parallel to the axis of rotation.

According to the invention, definition and reduction of the inclination angle may also be achieved by modifying the inclination of the work piece with the inclination of the cutting blade axis alternatively held constant or also simultaneously be adjusted.

With the measures indicated above, the CNC technology can be optimally used according to the existing current conditions.

According to the invention, the work piece is put into motion in the same direction of rotation as the cutting tool so that the surface of circumference of the work piece and the cutting blades are moved in opposite directions at contact and the cutting blades machine the surface openings along the circumference at regular intervals. Therefore, the work piece, in particular a ball cage for constant velocity joints, is completely finished in one work step and in a simple way, as far as openings or windows are concerned. In addition to the above described opposite movement, there is also the possibility for a synchronous rotation.

Alternatively, machining can also be done with a work piece that is fixedly held during machining of an individual opening. After finishing or completing machining of the individual openings, the work piece is brought into a position that allows machining of the next opening.

According to the invention, it may be desirable at the end of a machining process to increase the inclination angle in such a way that the forming of grooves in the opening edges, due to a subsequent pulling out or retraction of the cutting tool from the opening, is prevented. If the inclination angle were not to be increased and the work piece is pulled out or retracted in a direction normal to the machined work piece surface, undesired grooves would appear at least at one opening edge due to the inclination.

However, by a generally minimal increase of the inclination angle, and the thus reduced actual width of the cutting tool, this effect can be avoided. To machine the next opening, the mentioned angle modification is canceled if not angle modifications are necessary to compensate for the wear effects.

Alternatively, retraction grooves may be avoided by stopping rotation of the tool before turning the work piece to machine the next opening. Therefore, removal of the work piece is possible without any grooves appearing.

BRIEF SUMMARY OF THE INVENTION

BRIEF DESCRIPTION OF THE DRAWINGS

The invention is explained in more detail by the following drawing. It is shown:

FIG. 1 is a schematic representation of a cross section of a work piece, more specifically, a ball cage for constant velocity joints, and a cutting tool, which according to the invented procedure are in an inclined position facing each other;

FIG. 2 is a schematic representation of a cutting tool, a triangular cutting plate, in an initial position, in which the cutting blade axis is inclined at an angle to the vertical, and in a final position, in which the cutting blade is completely worn and the inclination angle reduced to 0°; and FIG. 3 is a schematic representation of a second application example of the procedure according to the invention in which the opening axis is inclined to the vertical.

DETAILED DESCRIPTION OF THE INVENTION

FIG. 1 shows a work piece, in this embodiment, of a ball cage 1 for constant velocity joints, in which window edges 6, 7 are to be machined with a cutting tool 2. The example shows a triangular shaped single-tooth milling cutter.

The shown ball cage 1 in the example is formed rotationally symmetric with an axis of rotation or longitudinal axis 4 and a bow shaped circumferential wall 5, which is bulging out towards the exterior and whose summit is in the middle of its longitudinal extension. In the ball cage 1 there are supposed to be finished window edges 6, 7, at regular intervals in the circumferential direction, which are shown in FIG. 1 with their finished dimensions. The upper and lower window edges 6, 7 are running in the direction of the thickness of the circumferential wall 5 at a right angle to the longitudinal axis 4 of the ball cage 1 and shows a mutual required distance 8, parallel to an imagined window axis 9, running through them. The imagined window axis 9 runs through the center of the thickness or horizontal extension of the window edges 6, 7, respectively, and, in the example shown in FIG. 1, parallel to the longitudinal axis 4 of the ball cage 1.

The cutting tool in the example shown is a triangular single-tooth milling cutter 2, which is attached to a shaft 10 of a CNC machine tool. The cutting plate of the single tooth milling cutter 2 shows two cutting edges or blades 11, 12, which define a cutting blade axis 13 running through both. The upper cutting blase 11 of FIG. 1 serves for machining the upper window edge 6 and the lower cutting blade 12 is for machining the lower window edge 7. Measured along the cutting blade axis 13, both cutting blades 11, 12 are positioned with a distance 14 from each other. This distance 14 is greater than the distance 8 of the window edges 6, 7 to be machined along the window axis 9. In the example shown, the cutting blade axis 13 runs parallel to the axis of rotation 15 of the machine tool shaft 10.

To machine the window edges 6, 7, the longitudinal axis 4 of the ball cage 1 or, respectively, the window axis 9 and the cutting blade axis 13 are positioned inclined to each other at an acute angle α so that the distance 14 (compare FIG. 2) of the cutting blades 11, 12 in the direction of the imagined window axis 9, i.e., in a parallel direction of projection 16 to the window edges 6, 7, corresponds to the required distance 8 of the window edges 6, 7. In the example shown, the inclination angle α is about 5°.

FIG. 2 shows in detail that in the initial state—i.e., unworn state—the distance 14 of the cutting blades 11, 12 relative to the cutting blade axis 13 is greater by a dimension □ than the required distance 8 of the window edges 6, 7 (compare FIG. 1) so that the cutting blades 11, 12 without inclination would stand out by □/2 beyond the window edges 6, 7 to be machined. By reducing the inclination of window axis 9 and cutting blade axis 13 towards each other, the cutting blade distance 14 in the direction of the window axis 9 is reduced due to a geometric relation: The cutting blade distance in the direction of window axis 9=cutting blade distance 14 in the direction of cutting blade axis 13·cos α.

With this initial inclination, the machining of the window edges 6, 7 is begun. As wear of the cutting blades 11, 12 increase, the inclination angle α is reduced increasingly towards 0° to compensate for the wear-related reduction of the cutting blade distance 14 or the cutting tool width. Here, either the inclination of the ball cage 1, the inclination of the cutting blade axis 13, or both may be changed. In the example shown, the cutting plate of the single-tooth milling cutter 2 is fixed rigidly to the shaft 10 and the inclination of the cutting blade axis 13 is changed by inclining the axis of rotation 15 of the shaft 10. Both window edges 6, 7 are machined simultaneously to the exact dimensions resulting in the machining time being reduced in-half, in contrast to the current state of technology, and while keeping the tolerance width over the lifetime of the tool. The wear dimension □ and the inclination angle α are adjusted in a way so that the tool 2 is worn by about the time the inclination angle α is reduced to 0°.

In the embodiment shown in FIG. 3, the window axis 9 runs inclined to the vertical with the window edges 6', 7' running horizontally in the direction of the thickness of the circumferential wall 5' so that the window edges 6', 7' are staggered horizontally to one another. As in the example described above, the cutting blade axis 13' is initially inclined at an angle α to the window axis 9'. With increasing wear of the cutting tool 2', the inclination angle α is reduced in a way that both window edges 6', 7' positioned horizontally staggered to each other can be finished simultaneously, i.e., in one step.

As indicated in FIG. 1, the work piece or ball cage 1 can be turned in the same rotational direction as the cutting tool 2 so that the circumferential surface, in which the window edges 6, 7 are to be machined and the tool 2 are moved in opposite directions at contact. Due to this, the tool 2 machines the window surfaces alongside the circumferential surface of the work piece or the ball cage 1 in regular intervals. Work piece 1 and cutting tool 2 are turned towards each other in a predetermined rotation ratio of $n_1/n_2$. If for example six windows 3 are to be manufactured alongside the periphery of the ball cage 1, the tool 2 rotates six times as fast as the ball cage 1. As an alternative to an opposite rotation a synchronous rotation is also possible.

We claim:

1. Procedure for machining openings in work pieces with the following steps:
   providing a cutting tool with an insert which rotates around an axis of rotation, the insert having two cutting edges positioned alongside of the axis of rotation with a distance to one another (11, 12) which determine a cutting blade axis running through both,
   supporting a work piece near the cutting tool in a way that an imagined opening axis (9), which runs through two oppositely positioned opening edges (6, 7) to be machined in a predetermined alignment to the cutting blade axis, and
   machining of the opening edges of the work piece by cutting one opening edge with one cutting edge and the other opening edge with the other cutting edge with both opening edges showing a required distance (8) to one another alongside the opening axis in a finished state,
   positioning of the two cutting edges (11, 12) along the cutting blade axis (13) at a distance to one another (14), which is greater that the distance (8) between the opening edges (6, 7),
   inclination of the opening axis (9) and the cutting blade axis (13) in an initial position at an acute angle (a) to one another so that the distance between the cutting edges (11, 12) parallel to the opening axis (9) is equal to the required distance (8) of the opening edges (6, 7), and
   reduction of the inclination angle (a) with a wear of the cutting edges (11, 12) so that the cutting distance between the cutting edges (11, 12) parallel to the opening axis (9) continues to correspond to the required distance (8) of the opening edges (6, 7).

2. Procedure according to claim 1 further comprising the step of setting the inclination angle (a) of the opening axis (9) to the cutting blade axis (13) in the initial position at an angle of up to 5°.

3. Procedure according to claim 1 further comprising the step of reducing the inclination angle (a) from the initial position to approximately 0°, with the cutting edges (11, 12) being totally worn at about 0°.

4. Procedure according to claim 1 further comprising the step of modifying the inclination angle by repositioning the cutting blade axis (13) and thereby reducing the inclination angle (a).

5. Procedure according to claim 4 further comprising the step of rigidly joining the cutting blade axis (13) and the axis of rotation (15) and by modifying the inclination of the axis of rotation (15) for positioning and reducing the inclination angle (a).

6. Procedure according to claim 5 further comprising the step of positioning the cutting blade axis (13) parallel to the axis of rotation (15) of the cutting tool (2).

7. Procedure according to claim 1 further comprising the step of modifying the inclination angle by repositioning the work piece (1) and thereby reducing the inclination angle (a).

8. Procedure according to claim 1 further comprising the steps of turning the work piece (1) in the same direction of rotation as the cutting tool (2) so that the circumferential surface of the work piece (1) and the cutting edges (11, 12) are moved opposing to each other at contact and the cutting edges (11, 12) machine openings (3) at regular intervals along the circumferential surface.

9. Procedure according to claim 1 further comprising the steps of turning the work piece (1) in the opposite direction of rotation as the cutting tool (2) so that the circumferential surface of the work piece (1) and the cutting edges (11, 12) are moved synchronous to each other at contact and the cutting edges (11, 12) machine openings (3) at regular intervals along the circumferential surface.

10. Procedure according to claim 1 machining one opening with the work piece held in a fixed position (1).

11. Procedure according to claim 1 further comprising the steps of, after machining, increasing the inclination angle (a) to an extent and removing the cutting tool from the opening thereby avoiding forming grooves in the opening edges during removal.

12. A method of machining openings in a work piece comprising the steps of:
    providing a cutting tool having an insert with two cutting edges, the edges located a first distance apart and defining a cutting axis extending through the edges;
    providing a work piece adjacent to the cutting tool, the work piece including a face in which an opening is to be machined, the opening having generally opposed opening edges located a second distance apart and defining an opening axis extending through the opening edges;
    positioning the cutting tool and the work piece such that the cutting axis and opening axis form an acute angle therebetween and the second distance being equal to the distance between the cutting edges along the opening axis;
    rotating the cutting tool about an axis of rotation; and as said cutting tool is rotated about the axis of rotation, advancing the cutting tool into the work piece along an axis substantially normal to the opening axis thereby machining the opening in the work piece.

13. The method of claim 12 wherein said positioning step forms the angle at an initial angle of about 5°.

14. The method of claim 12 wherein said positioning step forms the angle at an initial angle of not more than 5°.

15. The method of claim 12 further comprising the step of reducing the angle in proportion to wear of the cutting tool.

16. The method of claim 15 wherein said reducing step is achieved by moving the cutting tool and adjusting the cutting axis relative to the opening axis.

17. The method of claim 15 wherein said reducing step is achieved by moving the work piece and adjusting the opening axis relative to the cutting axis.

18. The method of claim 15 wherein said reducing step is achieved by moving both the work piece and the cutting tool thereby adjusting the angle therebetween.

19. The method of claim 12 further comprising the step of positioning the cutting tool such that the cutting axis is parallel to the axis of rotation.

20. The method of claim 12 further comprising the step of positioning the cutting tool such that the cutting axis is not parallel to the axis of rotation.

21. The method of claim 15 wherein the step of reducing is done such that the cutting axis and the opening axis are generally parallel when the cutting tool is substantially totally worn.

22. The method of claim 12 wherein said first distance is defined as being greater than said second distance.

* * * * *

UNITED STATES PATENT AND TRADEMARK OFFICE
CERTIFICATE OF CORRECTION

PATENT NO. : 6,711,818 B2
DATED : March 30, 2004
INVENTOR(S) : Angel Alvarez-Mendez et al.

It is certified that error appears in the above-identified patent and that said Letters Patent is hereby corrected as shown below:

<u>Title page,</u>
After Item [65], Prior Publication Data, insert Item as follows:
-- [30]   Foreign Application Priority Data
EP        00110567.5             May 18, 2000 --

Signed and Sealed this

Thirty-first Day of August, 2004

JON W. DUDAS
*Director of the United States Patent and Trademark Office*